Dec. 17, 1946.   M. R. BRIGGS ET AL   2,412,867
SEARCH SYSTEM FOR RADIO LOCATORS
Filed Nov. 10, 1943   3 Sheets-Sheet 1

WITNESSES:
Edward Michaels

INVENTORS
Maynard R. Briggs &
Angus A. Macdonald.
BY
F. W. Lyle
ATTORNEY

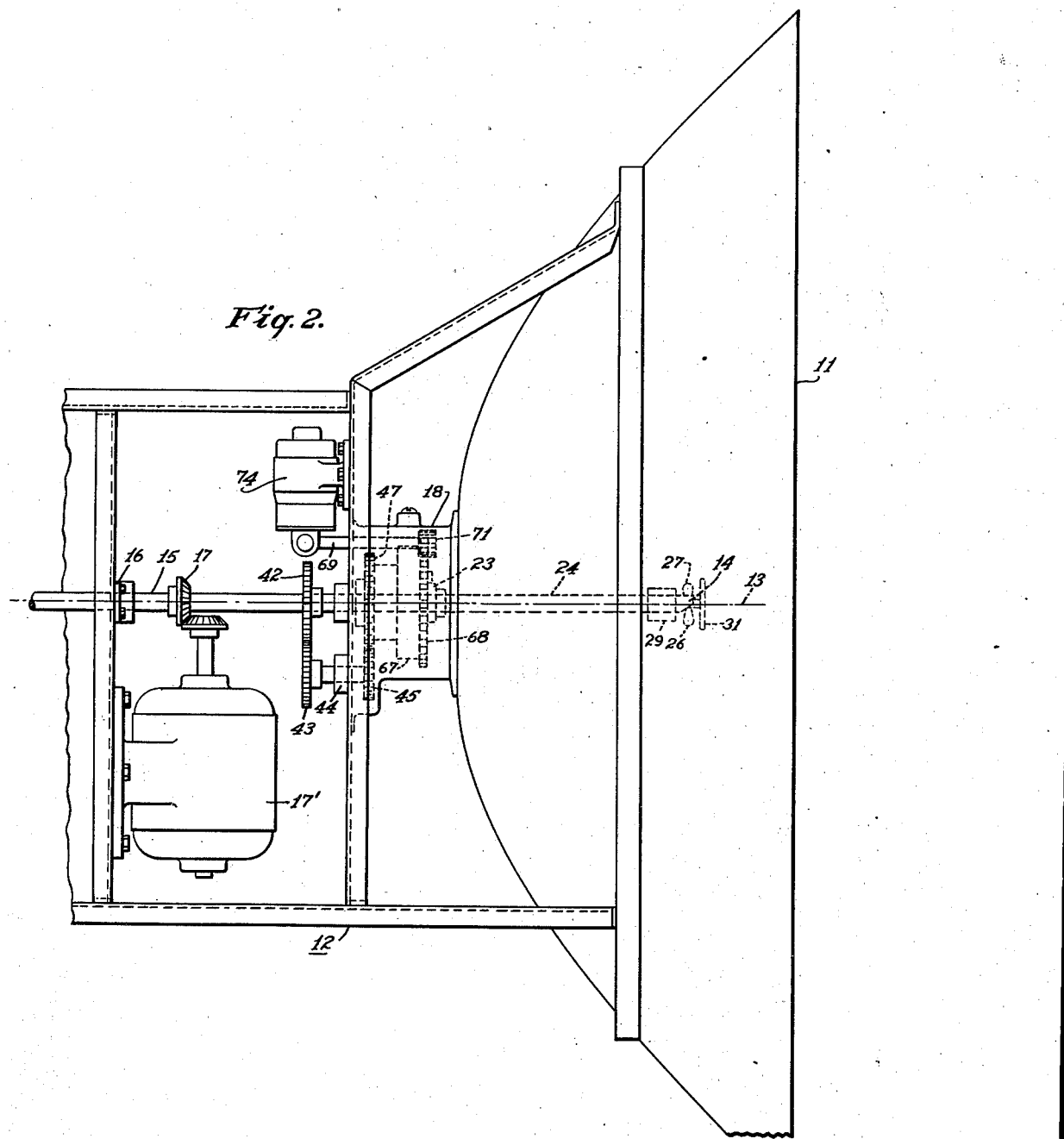

Dec. 17, 1946.  M. R. BRIGGS ET AL  2,412,867
SEARCH SYSTEM FOR RADIO LOCATORS
Filed Nov. 10, 1943  3 Sheets-Sheet 3

WITNESSES:
Edward Michaels

INVENTORS
Maynard R. Briggs &
Angus A. Macdonald.
BY
F. W. Lyle
ATTORNEY

Patented Dec. 17, 1946

2,412,867

UNITED STATES PATENT OFFICE 2,412,867

SEARCH SYSTEM FOR RADIO LOCATORS

Maynard R. Briggs and Angus A. Macdonald, Catonsville, Md., assignors to Westinghouse Electric Corporation, East Pittsburgh, Pa., a corporation of Pennsylvania Application November 10, 1943, Serial No. 509,684

8 Claims. (Cl. 250—11)

Our invention relates to apparatus producing beams of electromagnetic radiation and, in particular, relates to apparatus of that type suitable for use in locating objects at a distance by means of beams of the electromagnetic energy. Systems of this type which have recently come into wide use are known as radar systems.

There has been a considerable development of arrangements which employ a constricted beam of ultra-short radio waves to scan distant regions in which reflecting objects, such as ships or aircraft, are expected to be present, the reflected energy of the beam being detected when the beam is in such a position as to impinge on the reflecting object. By noting the direction in which the beam is pointed at the time reflections of energy are received, it is possible to determine the direction of the reflecting object. In most instances, the beam is produced by locating a short-wave antenna close to the focus of a parabolic reflector, and the reflector is then rotated and tilted to periodically scan the region in which the reflecting objects are expected. In certain cases, however, the direction of the expected objects is known with a fair degree of accuracy, and it is then possible to maintain the reflector pointed in the general direction and to determine the precise position of the object by causing a periodic displacement of the beam about the central axis of the reflector. This latter effect may be achieved by displacing the radiating antenna, usually a small di-pole, laterally from the central axis of the reflector, and rotating it periodically about this axis in a circle. When the antenna is displaced laterally from the focus of the reflector, the beam of radiant energy is, in effect, tilted and sent out at an angle relative to the central axis of the reflector. Thus, in Figure 1, as the double dot-and-dash line $l$ represents the central axis of the reflector, the intensity of the beam with the antenna displaced laterally in the plane of the paper from the focus is represented by the polar curve 2 shown in heavy lines. It will be seen from the curve 2 that the line of greatest intensity of the beam is tilted at an angle $a$ to the reflector-axis $l$. If now the antenna is rotated in a circle about the focus, the curve 2 will rotate likewise about the axis $l$, the angle $a$ remaining constant.

If a beam having the configuration of that just described strikes a distant object which is located at a point other than on the axis $l$ of the reflector, the intensity of energy striking the object, and hence the intensity of the received reflection, will vary periodically as the antenna rotates about the focus of the reflector. The maximum reflected energy will be received at the instant when the central axis of the beam is closest to the reflecting object; and by noting the position of the antenna at which the maximum reflected energy is received, it is possible to determine the position of the beam when its axis is nearest the object, and hence to determine the direction of the object in respect to the central axis of the reflector.

The highest degree of precision in determining the instant when the reflected energy is a maximum is attained when the beam sent out by the reflector is rather narrow; that is to say, when the distance 4 in Fig. 1 is relatively small. On the other hand, if the antenna is maintained always so close to the focus of the reflector as to give maximum precision in the readings of the intensity of the reflected wave, the angular distance $a$ in Fig. 1 is so small that the total solid angle swept over by the beam during one period of its rotation is relatively small; and consequently the area searched for reflecting objects is relatively limited. On this account, it is desirable that in searching for the presence of the reflecting object the antenna be displaced considerably from the focus of the reflector. Then, once the object has been picked up and its approximate direction been determined, the reflector can be turned so that its axis coincides more closely with that direction, and the antenna may then be moved closely enough to the focus of the reflector so as to give the greatest accuracy in determining the time of arrival of the maximum reflected energy.

It is, accordingly, one object of our invention to provide an arrangement in which a radiating antenna may be subjected to periodic motion relative to the focus of a reflector in such a way as to scan a relatively wide solid angle in order to pick up reflecting objects, and thereafter be moved relative to said focus in such a way as to insure a high degree of precision in determining the direction of the reflecting object.

Another object of our invention is to provide an arrangement in which a radiating antenna may be rotated about a curve of varying radius relative to the focus of a reflector.

Another object of our invention is to provide an arrangement in which the beam of radiation sent out by a reflector energized by a source of short-wave radio may be periodically varied in effective width while at the same time it rotates periodically about the central axis of the reflector.

Still another object of our invention is to provide an arrangement in which an antenna may be moved about the focus of a reflector periodically in a curve of varying radius.

Other objects of our invention will become apparent upon reading the following description, taken in connection with the drawings, in which:

Fig. 2 is a view in elevation showing a reflector provided with a radiating antenna which is caused to move about the focus of the reflector, in accordance with our invention;

Figure 3:
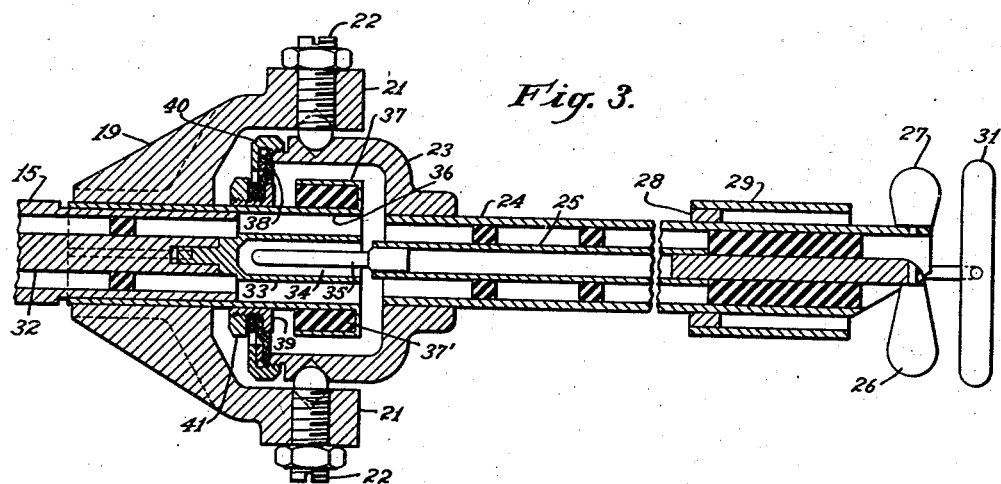
Fig. 3 is a sectional view through the central axis of the antenna and the concentric line supplying it, and showing details of a flexible coupling making it possible to rotate the antenna while, at the same time, displacing it at a variable radial distance from the central axis of one portion of the transmission line.
Figure 1:
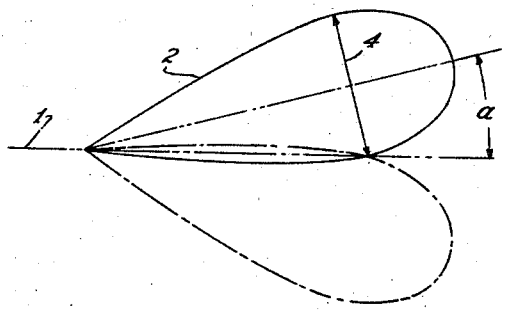
Figure 1 is an explanatory diagram representing the energy intensity plotted in polar coordinates sent out by a reflector system embodying the principles of our invention.

Referring in detail to Figure 2, a reflector 11 which may be of any suitable conductive material well known in the art, and which is preferably of substantially parabolic section, is mounted in a framework 12 which is suitably supported to be turned in any desired direction at will, by arrangements well known in the art, and forming no part of our present invention. The reflector 11 has a central axis 13 on which is positioned its focal point 14. Positioned with its axis concentric with the axis 13 is a transmission line of the concentric type shown in more detail in Fig. 3. One portion 15 of the transmission line is supported in suitable bearings 16 on the framework 12, so that it may be rotated about its central axis. Such rotation may be imparted to the portion 15 by a set of bevel gears 17 transmitting motion from a suitable motor 17' which is supported on the frame 12. The transmission line portion 15 passes through the interior of a chamber 18 which is attached to the reflector 11, and which is shown in section in more detail in Fig. 4.

Figure 4:
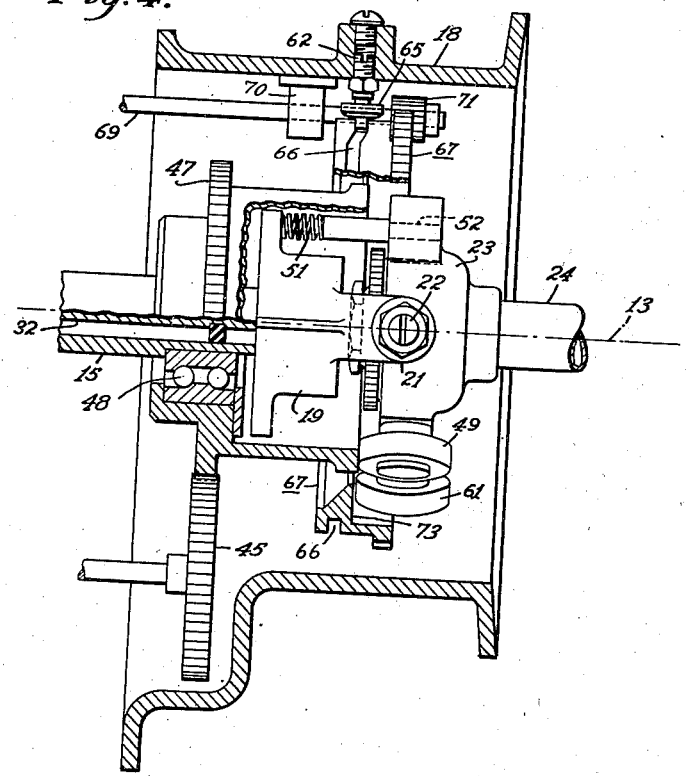
Fig. 4 is a view, partly in section and partly in elevation, of the mechanism for producing the desired movement of the antenna relative to the focus of the reflector, in accordance with our invention.
Figure 6:
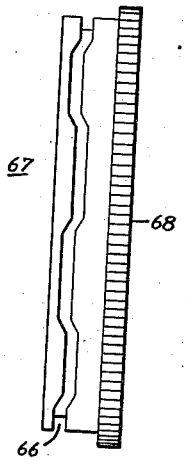
Fig. 6 is a detailed view of one of the component parts of the mechanism of Figs. 4 and 5.
Figure 5:
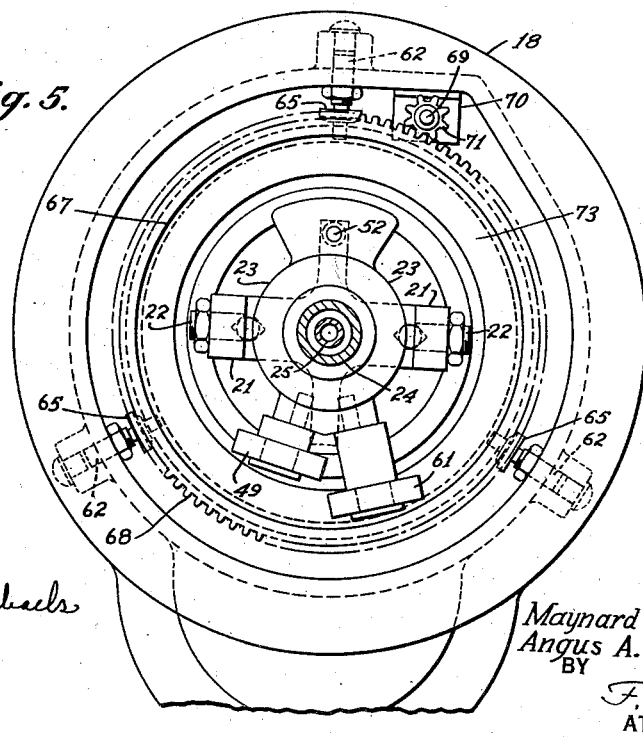
Fig. 5 is a view in elevation at right angles to the view in Fig. 4 of the same mechanism.

As is shown in more detail in Fig. 3, the transmission line portion 15 terminates in what may be termed an end-bell 19 having two projecting arms 21 containing set screws 22 which form gimbals in which is supported an end-bell 23 which is connected to a second concentric transmission line-portion 24. The portion 24 has a core-portion 25 concentric with its axis which terminates at the focus 14 of reflector 11 in an extension 26, forming one branch of the radiating antenna. The other branch 27 of the radiating antenna is attached to the line-portion 24. The line-portion 24 is likewise surrounded by an annular ring 28 of conducting material which supports a conducting sleeve 29, leaving an annular space between the sleeve 29 and the line-portion 24 which is approximately one-quarter wave length long. There is likewise supported on the line-portion 24, and in front of the antenna halves 26, 27, a conducting dummy-element 31. It may be noted that the antenna portions 26 through 31 may be replaced by any other suitable radiating-antenna arrangement adapted to the short radio waves being utilized to produce the beam.

The central core 32 which cooperates with the line-portion 15 has a slightly flared end-portion 33 having a central hole 34 concentric with its axis into which extends a cylindrical extension 35 from the core-portion 25. The width of the annular space 34 is made sufficient so that the extension 35 will not come within sparking distance of the bell-portion 33, when the line section 24, 25 is rotated in the gimbals 21, 22, 23 through the maximum angle in which the arrangement is intended to operate.

The line-portion 15 is provided with an extension 36 having a turned-back cuff portion 37 which is spaced away far enough from the walls of the end-bell 23, so that it will never come within sparking distance thereof when the gimbals 21, 22, 23 are turned through their maximum range of operation. The flared end of the end-bell 23 is provided with a screw-cap 40 which is adapted to hold in place a flexible diaphragm 38 which may, for example, be of rubber, and which has its inner edge attached to the extension 36 by a suitable collar 39 and a nut 41. The length of the annular channels separating the extension 35 from the flared end 33, and separating cuff 37 from end-bell 23, are preferably approximately one-quarter the wave length of the radiation sent out by antenna 26, 27. Cuff 37 is made electrically one-quarter wave length long by addition of an insulating material 37' inserted between the folded back portion 37 and 36.

Fastened to the line-portion 15 is a gear wheel 42 which meshes with a second gear wheel 43 which is supported in a bearing 44 on frame 12. Attached to the same shaft as the gear 43 is a third gear 45 which meshes with gear teeth on a drum 47 which is supported, in turn, on ball bearings 48 surrounding line-portion 15. The ratio of the respective gears 42 to 45 is such that the drum 47 rotates relative to the line-portion 15, preferably at a relatively slow rate. The drum 47 extends over a portion of the end-bell 19, and has its annular end-face which is nearest to the antenna 26, 27 shaped so that it does not fall in a plane perpendicular to the axis 13. Extending radially from the external face of the end-bell 23 is a stud which supports a roller 49 positioned so that it can traverse the annular path along the end-face of the member 47. A spring 51 extending between the end-bell 19 and a stud 52 which projects from the end-bell 23 biases the roller 49 into contact with the end-face of drum 47.

It will be remembered that the drum 47 rotates relative to the line-section 15 to which the end-bell 19 and the gimbals 21, 22, 23 are attached. The drum 47, accordingly, rotates relative to the end-bell 23; and as it does so, the roller 49, making contact continually under the stress of spring 51 with the end-face of drum 47, traverses an annular path on the latter the plane of which is not normal to the axis 13. In view of the latter fact, it will be seen that the end-bell 23 will be moved by the roller 49 about the axis of set-screws 22, and caused to periodically tilt in varying angles relative to the axis 13. In consequence of the continual periodic tilting of the end-bell 23, the line-portion 24 and the antenna 26, 27 attached thereto will be periodically tilted to varying angles relative to the axis 13, and hence a periodic radial movement will be imparted to the antenna 26, 27, relative to the focus 14 of the reflector 11. The frequency of the periodic motion will, of course, be equal to the difference in number of revolutions per second of the drum 47 relative to the line-portion 15. Since the line-portion 15 is rotating on its axis relative to the reflector 11, the antenna 26, 27 will rotate relative to the reflector 11 at a frequency relative to the number of revolutions per second imparted by the motor 17' to the line-section 15. The antenna 26, 27 will, accordingly, rotate about the focus of reflector 11 in a periodic curve having a radius which periodically varies between limits which are determined by the contour of the end-face of the drum 47. The last-mentioned contour may, for example, lie in a plane which is other than normal to the axis 13 or, instead of being plane, this end-surface may be warped in ways obvious to those skilled in the art, to provide for the description by the antenna 26, 27 of any desired curve about the focus 14.

The arrangement thus far described represents the condition in which the apparatus is intended to operate during the search period in which the approximate position of an approaching object is to be determined. By suitable oscillographic or other arrangements well known in the art, by which the position versus time curve representing the rotation of line-portion 15 and the intensity versus time curve for the received reflected energy can be correlated, the azimuth of the antenna 26, 27 about the axis 13 at the time when the object is closest to the center of greatest intensity in the beam from reflector 11 can be determined. The frame 12 can then be displaced by suitable arrangements well known in the art, but not shown here, to move the axis 13 of the reflector 11 close to the direction of the object. It then becomes desirable to stop the periodic radial movement of the antenna 26, 27 relative to the focus 14, and to rotate it in a circle of relatively small diameter about that focus.

In order to effect the result just described, we mount on the end-bell 23 a second roller 61 on a radially projecting stud. We further provide the sleeve 18 with three projecting studs 62 which support rollers 65 and extend radially inward from the sleeve 18. The rollers 65 engage a slot 66 in an annular member 67 having a projecting rim 68 provided with suitable gear teeth. A shaft 69 is supported in suitable bearings 70 on the inner face of the sleeve 18 in a position parallel to the axis 13, and is provided with a pinion 71 adapted to mesh with the gear teeth on rim 68.

The annular member 67 is formed with a ledge 73 lying in a plane normal to axis 13 and adapted to form an annular path to be traversed by roller 61. The slot 66 is so cut that the distance of its center line from the rim 68 varies with circumferential distance about the rim 68. The position of the stud 62 on the sleeve 18 is so determined that when the stud 62 engages those portions of the slot 66 which are least distant from the rim 68, the ledge 73 is displaced so far away from focus 14 (i. e., displaced to the left in Fig. 4) that it can not engage the roller 61 even when, in course of rotation of the end-bell 23 about the axis 13, the roller 49 engages the portion of the end-face of drum 47 which is most distant from focus 14 (i. e., when it engages the portion of the end-face of drum 47 which is farthest to the left in Fig. 4). Under such circumstances, the roller 49 is able to follow in engagement of the end-face of drum 47 during the entire revolution of antenna 26, 27 about focus 14.

However, it will be observed that the member 67 stands stationary relative to the sleeve 18, framework 12 and reflector 11, and is unmoved by the rotation of the transmission line 15—24 and all their connected parts within the framework 12, as previously described. The end of the shaft 69 is provided with suitable means, such as a motor 74, so that it may be rotated when desired. When it is desired to stop the periodic tilting of the antenna 26, 27 relative to the focus 14, after the approximate position of an approaching object has been determined, the shaft 69 is rotated; thereby imparting a rotary movement to the member 67 and causing the slot 66 to move relative to and along the stud 62. Movement of the roller 65 in the slot 66 will obviously move the member 67 toward focus 14 (i. e., move it farther to the right in Fig. 4); thereby displacing the annular ledge 73 into contact with roller 61, and thereby preventing roller 49 from thereafter following the contour of the end-face of drum 47. Since the annular ledge 73 lies in a plane normal to the axis 13, the progress of the roller 61 about this ledge will cause no tilting of the end-bell 23 and its attached antenna 26, 27 upon the set-screws 22, but will maintain the antenna 26, 27 at a fixed radial distance from the focus 14 of the reflector 11. The antenna 26, 27 will thereafter describe a circle of small radius about the focus 14, this radius being determined by the number of times shaft 69 is turned, and the apparatus will be in the condition for most accurate determination of the direction of the reflecting object relative to axis 13.

Obviously, when it is desired to return the apparatus to the search condition in which the antenna 26, 27 describes a curve of periodically varying radius about the focus 14, the shaft 69 may be turned so as to move the pivot 62 to the position in slot 66 initially described.

While we have described, as required by the patent statutes, a specific mechanism for producing the desired movement of the antenna 26, 27 relative to the focus 14 of reflector 11, it will be obvious that there is a possibility of devising other mechanisms for effecting such a movement. This particular mechanism is, accordingly, only a particular embodiment of our broader invention which is the possibility inherent in providing for movement of the antenna in a periodic curve of varying radius while searching, and in following a curve of substantially constant radius about the focus while making more accurate determinations of the direction of the reflecting object

We claim as our invention:

1. In a system of ultra-high frequency beam transmission, means for projecting a beam into space, means for rotating said beam at a fixed angular displacement with respect to the normal axis of rotation thereof, and means for increasing said angular displacement at recurrent intervals which have a periodicity small compared with that at which said rotating is carried out.

2. In a system of ultra-high frequency beam transmission, means for projecting a beam into space, means for rotating said beam at a fixed angular displacement with respect to the normal axis of rotation thereof, and means for increasing said angular displacement at recurrent intervals of fixed periodicity which is small compared with that at which said rotating is carried out.

3. In a system of ultra-high frequency beam transmission, means for projecting a beam into space, means for rotating said beam at a fixed angular displacement with respect to the normal axis of rotation thereof, and means for gradually increasing said angular displacement at recurrent intervals which have a periodicity small compared with that at which said rotating is carried out.

4. In a system of ultra-high frequency beam transmission, means for projecting a beam into space, means for rotating said beam at a fixed minimum angular displacement with respect to the normal axis of rotation thereof, and means for gradually increasing said angular displacement from said minimum position to another position of maximum displacement and gradually decreasing from said maximum displacement to said minimum displacement at recurrent intervals of fixed periodicity which is small compared with that at which said rotating is carried out.

5. In an ultra-high frequency radio locator system, means radiating a beam of ultra-high frequency energy comprising an antenna rotatably disposed near the axis of a parabolic reflector, said antenna being displaced at an angle from the axis of said parabola, means for varying the effective width of the radiated beam comprising means for changing the angle of displacement of said antenna from said angle to another angle while said antenna is being rotated.

6. In an ultra-high frequency radio locator system, means radiating a beam of ultra-high frequency energy comprising a wave guide rotatably disposed near the axis of a parabolic reflector, said wave guide being displaced at an angle from the axis of said parabola, means for varying the width of the radiated beam comprising means for changing the angle of displacement of said wave guide from said angle to another angle while said wave guide is being rotated.

7. The method of locating an object by means of a beam of ultra-high frequency energy for the purpose of range finding which comprises, irradiating space having the form of a hollow conical pattern, sweeping the field of search by said pattern, enlarging the effective base of said conical pattern for rough location of said object at will during sweeping said field of search, and narrowing said effective base upon location of the object for accurate determination of range.

8. The method of locating an object by means of a beam of ultra-high frequency energy for the purpose of range finding which comprises, irradiating space having the form of a hollow conical pattern sweeping the field of search by said pattern, enlarging the effective base of said conical pattern for rough location of said object at recurrent intervals of fixed periodicity during sweeping said field of search, and narrowing said effective base upon location of the object for accurate determination of range.

MAYNARD R. BRIGGS.
ANGUS A. MACDONALD.